(12) United States Patent
Kertesz et al.

(10) Patent No.: US 7,909,369 B2
(45) Date of Patent: Mar. 22, 2011

(54) COUPLING FOR JOINING TWO PIPES

(75) Inventors: Janos Kertesz, Hofheim (DE); Gerhard Wachter, Büdingen (DE)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 11/657,792

(22) Filed: Jan. 25, 2007

(65) Prior Publication Data
US 2007/0132242 A1 Jun. 14, 2007

Related U.S. Application Data

(62) Division of application No. 11/329,881, filed on Jan. 11, 2006, now abandoned.

(30) Foreign Application Priority Data

Jan. 12, 2005 (DE) .......... 10 2005 001 380
Feb. 10, 2005 (DE) .......... 10 2005 006 330

(51) Int. Cl.
*F16L 23/00* (2006.01)
(52) U.S. Cl. ........ 285/406; 285/242; 285/369; 285/374; 285/418; 285/420
(58) Field of Classification Search .............. 285/23, 285/37, 45, 92, 242, 252, 319, 322, 369, 285/374, 399, 406, 407, 411, 417, 418, 420, 285/244, 318; 24/20 CW, 22, 23 R, 26 EE, 24/23 W; 403/293, 289, 290, 326
See application file for complete search history.

(56) References Cited

U.S. PATENT DOCUMENTS

| | | | | |
|---|---|---|---|---|
| 1,507,981 A * | 9/1924 | Winters et al. | ................ | 285/403 |
| 2,185,741 A * | 1/1940 | Sorg et al. | ................ | 285/115 |
| 2,198,698 A * | 4/1940 | Fitzmeyer | ................ | 15/210.1 |
| 2,994,499 A * | 8/1961 | Waters | ................ | 248/74.3 |
| 3,185,488 A * | 5/1965 | Christensen et al. | ...... | 277/381 |
| 3,197,262 A * | 7/1965 | Fairchild | ................ | 175/325.6 |
| 3,495,853 A * | 2/1970 | Furrer | ................ | 285/81 |
| 3,606,218 A * | 9/1971 | Enlund et al. | ................ | 248/74.2 |
| 3,851,901 A * | 12/1974 | Sills | ................ | 285/112 |
| 3,881,753 A * | 5/1975 | Bochory | ................ | 285/82 |
| 3,894,780 A * | 7/1975 | Broussard | ................ | 175/325.6 |
| 3,961,993 A * | 6/1976 | Palisin, Jr. | ................ | 428/472.1 |
| 4,358,140 A * | 11/1982 | Jonsson | ................ | 285/419 |
| 4,366,011 A * | 12/1982 | Nolf | ................ | 156/86 |
| 4,398,772 A * | 8/1983 | Odell | ................ | 175/325.6 |
| 4,408,924 A * | 10/1983 | Huebner | ................ | 403/23 |
| 4,741,559 A * | 5/1988 | Berghman | ................ | 285/45 |
| 4,821,532 A * | 4/1989 | Jaques et al. | ................ | 63/3 |
| 4,982,983 A * | 1/1991 | Lenzi et al. | ................ | 285/281 |
| 5,265,890 A * | 11/1993 | Balsells | ................ | 277/467 |
| 5,388,321 A * | 2/1995 | Farrell | ................ | 29/447 |
| 6,076,560 A * | 6/2000 | Stahle et al. | ................ | 138/112 |
| 6,106,025 A * | 8/2000 | Kang | ................ | 285/45 |

(Continued)

*Primary Examiner* — James M Hewitt
*Assistant Examiner* — Jay R Ripley
(74) *Attorney, Agent, or Firm* — Lucas & Mercanti, LLP; Klaus P. Stoffel

(57) ABSTRACT

A coupling for joining two pipes having end sections, each of which is provided with a circumferential locking rib and can be inserted into the coupling, wherein the coupling has at least one elastic ring that joins at least two elongated webs, and wherein the coupling has stop projections, which lock in place behind the locking ribs when the end sections are inserted in the coupling and can be unlocked to release the connection of the pipes by expanding the at least one ring. Each ring is a separate element from the webs.

4 Claims, 7 Drawing Sheets

U.S. PATENT DOCUMENTS

| | | | |
|---|---|---|---|
| 6,425,494 B1 * | 7/2002 | Woods, II | 220/739 |
| 6,443,501 B1 * | 9/2002 | Ketcham et al. | 285/319 |
| 6,480,363 B1 * | 11/2002 | Prater | 360/265.7 |
| 6,508,442 B1 * | 1/2003 | Dolez | 248/74.1 |
| 6,561,958 B2 * | 5/2003 | Pappert | 482/105 |
| 6,565,129 B2 * | 5/2003 | Surjaatmadja | 285/373 |
| 6,601,802 B1 * | 8/2003 | Howe | 248/58 |
| 6,672,628 B2 * | 1/2004 | Thomas et al. | 285/320 |
| 6,837,787 B2 * | 1/2005 | Crook | 454/292 |
| 7,004,477 B2 * | 2/2006 | Sakata et al. | 277/612 |

* cited by examiner

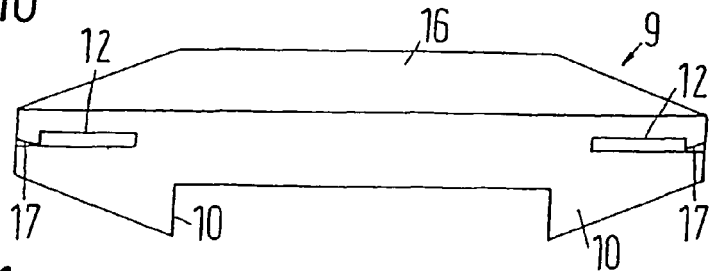
Fig.10
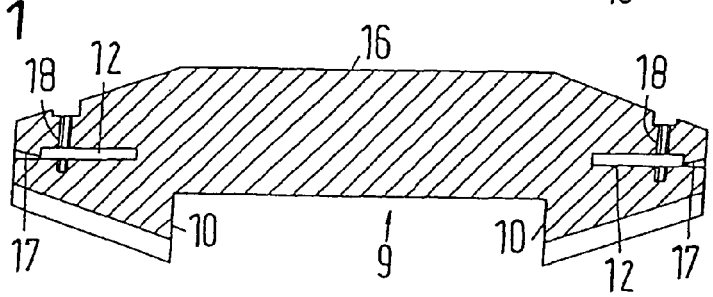
Fig.11
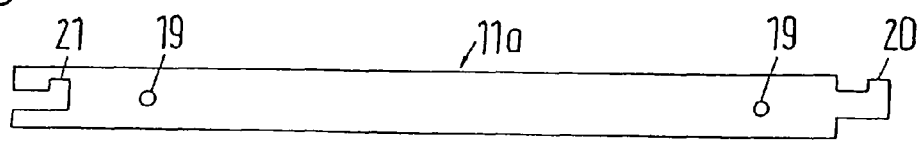
Fig.12 Prior Art
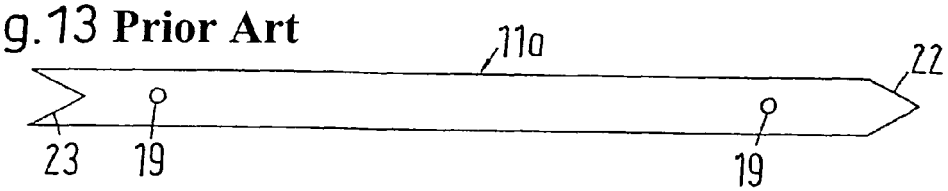
Fig.13 Prior Art
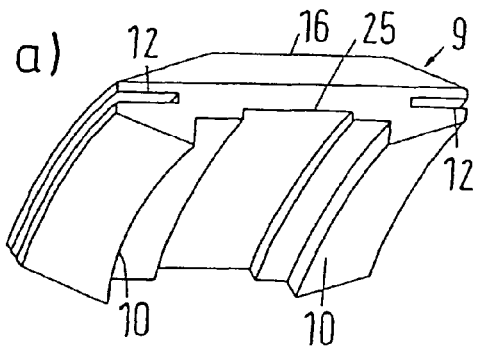
a)
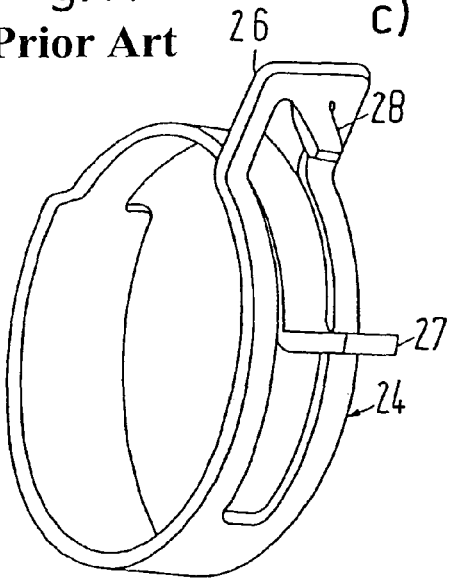
Fig.14 Prior Art
c)
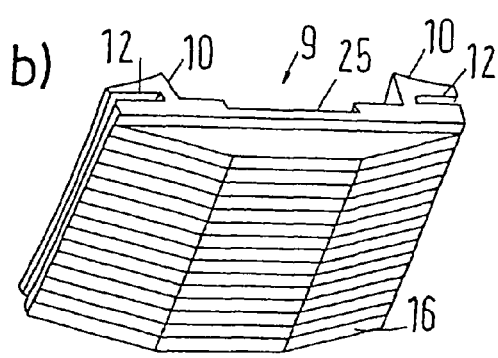
b)

COUPLING FOR JOINING TWO PIPES

The present application is a Divisional of U.S. patent application Ser. No. 11/329,881, filed Jan. 11, 2006 now abandoned, which claims priority of German application Nos. 10 2005 001 380.5-24 filed Jan. 12, 2005 and 10 2005 006 330.6-24 filed Feb. 10, 2005

BACKGROUND OF THE INVENTION

1. Field of the Invention

The present invention relates to a coupling for joining two pipes, whose end sections, each of which is provided with a circumferential locking rib, can be inserted into the coupling, wherein the coupling has at least one elastic ring that joins at least two elongated webs, and wherein the coupling has stop projections, which lock in place behind the locking ribs when the end sections are inserted in the coupling and can be unlocked to release the connection of the pipes by expanding at least one of the rings.

2. Description of the Related Art

A coupling of this type is known from EP 1 378 701 A 1. It is produced as a one-piece injection-molded plastic part. However, if a very hot fluid is to be conducted through the pipes that are to be joined, it is possible that at least those parts of the coupling that come into direct contact with the pipes will not be able to withstand the high temperatures of the fluid or the pipes. The same problem can occur in the vicinity of a very hot object, e.g., the engine or exhaust system of a motor vehicle. Moreover, the webs are designed as spring arms. Therefore, the coupling is unable to withstand strong forces that act to bend the pipes relative to each other, so that the joint would become loose.

SUMMARY OF THE INVENTION

It is the primary object of the invention to provide a coupling of the aforementioned type which can be produced at least partly from material that is more heat-resistant and can withstand larger mechanical loads.

In accordance with the invention, this objective is achieved by the fact that each ring has been produced separately from the webs.

With this type of construction, the materials for the individual parts can be more or less freely selected.

For example, it is possible for the webs to be flexurally stiff, for example, by the use of suitably stiff material, particularly metal.

Furthermore, the webs can be provided with stiffening ribs, especially ones which extend in the longitudinal direction of the webs.

In addition, more than two webs can be provided, for example, three or four webs that are uniformly distributed over the circumference of the ring or rings or two webs on one side of the coupling and two webs on the other side.

The coupling can consist exclusively of metal.

In this regard, at least the sole ring or each ring can contain spring steel.

It is especially advantageous if each ring is designed as a spring band clip. A spring band clip can be expanded against its spring tension in a conventional way to release the coupling from at least one of the pipes, especially if the spring band clip is fastened at one end or near one end of the webs, and thus to release the connection of the pipes. If only one spring band clip is used as the only ring, it can also be fastened in the middle of the length of the webs. In this case, the coupling can also be released from both pipes at the same time by means of the spring band clip.

Alternatively, it is possible for the webs and/or the one ring or at least one of the rings to contain plastic, especially reinforced plastic.

In addition, the rings can also be constructed conventionally as closed circular rings with a greater diameter than the pipes, or they can be oval in shape. If they are oval, the stop projections should be located within those regions of the rings whose radius of curvature is the greatest. The rings can then be radially expanded in the regions that have th~ stop projections by radial compression of the regions of the rings between the stop projections in order to unlock the stop projections behind one or both of the locking ribs and release the connection of the pipes by the coupling.

Furthermore, the webs can have a metal core that is extrusion-coated with plastic.

When two rings are used, one of them can have been connected with one end of each web and the other can have been connected with the other end of each web.

In addition, each web can have one groove per ring for holding the ring.

In this regard, each end of the webs can have a groove for receiving a ring.

Each groove can extend transversely to the longitudinal direction of the webs, while the depth of the grooves extends in the longitudinal direction of the webs, and the width of the grooves corresponds to the thickness of the rings.

The rings can have been formed from strips, which have been secured in at least one of the grooves. In this regard, the ends of the strips can have been joined by positive locking, and each ring can have been secured in at least one groove of the webs by an interference fit, snap fit, positive locking, or material bonding.

Preferably, each ring is corrugated.

Alternatively, each ring can have been produced as a closed ring by injection molding. This eliminates their production from strips, bending them together in the shape of a ring, and joining the ends of the strips.

Another possibility consists in having joined the rings by elongated parts that have been secured in longitudinal grooves of the webs by a snap fit. This has the advantage that in the case of relatively small diameters of the pipes, the rings can remain unchanged, and only the radii of curvature of the webs and their stop projections would have to be reduced accordingly.

In addition, the webs can consist of thermoplastic material, in which case each ring has been extrusion-coated by the material of the webs. This eliminates the need for separate assembly of the rings and webs. Nevertheless, they can be produced from different materials. If the rings have been made of metal, they are simultaneously protected against corrosion by the plastic that surrounds them.

When two webs are used, the webs can have been joined by a joint, especially a film joint or hinge. The webs then always remain joined, which is advantageous especially with respect to their storage, transport, or assembly.

If the rings are designed as spring band clips on or near the ends of the webs, the spreading jaws of one of the spring band clips should be displaced by 180° in the circumferential direction of the coupling relative to those of the other spring band clip. With this arrangement, it is possible to move the webs uniformly over the circumference of the coupling in the radial direction towards the outside during the expansion of the spring band clips by spreading their spreading jaws in order to release the coupling from the pipes.

Furthermore, each web can have been alternatively produced from a sheet-metal part by punching and bending.

In another embodiment, when the ring or each ring is made of spring steel, each ring has a break and a joint on the diametrically opposite side from the break, the webs consist of plastic, and each ring is held in the plastic of the webs except for the break and the joint. In this regard, each web extends over almost half the circumference of the ring, more or less in the form of one half of a hollow cylinder cut in two axially. Therefore, the webs are very flexurally stiff about an axis that extends transversely to their axial length. Due to the break(s) and the joint(s), the webs, including the ring or rings, can be spread approximately radially to the pipes in a simple way by inserting a spreading tool, e.g., spreading pliers, into the gap or slit formed by the break in order to disengage the stop projections from the locking ribs of the pipes and open the coupling, so that at least one of the coupled pipes can be pulled out of the coupling to separate the pipes when desired.

In this embodiment, the joint can be an elastically flexible part of the ring. This part of the ring is thus an integral, one-piece part of each ring. Therefore, the joint is formed at the same time that the ring is produced.

The joint forms a bulge that projects outwardly from the ring. Due to this shape of the joint, when the coupling is opened, the webs and thus their stop projections are moved outward more or less the same distance in the radial direction of the pipes and disengage from the locking ribs of the pipes without a large spreading movement of the ring or rings. This is an advantage, for example, in the case of very small pipe diameters and correspondingly small ring diameters.

In addition, each ring can have been extrusion-coated with the plastic of the webs. This saves separate assembly of the parts of the coupling. At the same time, the plastic provides corrosion protection for the ring or rings.

To facilitate the opening of the coupling when the break in the ring leaves only a very small gap that would make it difficult to insert a spreading tool, the webs can have radially outwardly projecting knobs on both sides of the break. The spreading tool can then be easily inserted between these knobs. The knobs can be formed in a very simple way at the same time as the web injection process.

In this embodiment as well, provision is preferably made to provide a ring close to or at each end of the web and to arrange the break in one ring with a displacement of 180° relative to the break in the other ring in the circumferential direction of the rings. This arrangement of the breaks in the rings also assists in allowing the webs to be uniformly lifted from the pipes in the radial direction over their circumference until their stop projections no longer engage the locking ribs of the pipes, so that the pipes can be separated.

In addition, the webs can be held together by a connecting device, which releasably bridges the ring break or each ring break. This connecting device increases protection against spreading of the rings under high bending forces exerted on the coupling. At the same time, it serves as an assembly indicator, which makes it evident whether the connection of the pipes by the coupling has been carried out correctly.

EP 1 378 701 A 1 also discloses a coupling for joining two pipes, whose end sections, each of which is provided with a circumferential locking rib, can be inserted in the coupling, wherein the coupling has at least two elastic ring segments that join at least two elongated webs, and wherein the coupling has stop projections, which lock in place behind the locking ribs when the end sections are inserted in the coupling and can be unlocked to release the connection of the pipes by deforming at least one of the ring segments.

With respect to this disclosure, a second objective of the invention is likewise to specify a coupling which can be produced at least partly from material that is more heat-resistant and can withstand larger mechanical loads.

In accordance with the invention, this second objective is likewise achieved by the fact that each ring segment has been produced separately from the webs.

The various features of novelty, which characterize the invention, are pointed out with particularity in the claims annexed to and forming part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

In the drawing:

FIG. 10 is a side view of a somewhat modified web of the coupling of FIG. 1;

FIG. 11 shows another modification of a web of the coupling of FIG. 1 in longitudinal section;

FIG. 12 shows an embodiment of a ring of the coupling of FIG. 1 that is somewhat modified relative to FIGS. 7 to 9 in the non-bent (flat) state before closure of the ring;

FIG. 13 shows another modification of a ring of the coupling of FIG. 1 in the non-bent state before closure of the ring;

FIG. 14 is a perspective exploded view of a second embodiment of a coupling of the invention with two webs and a spring band clip;

DETAILED DESCRIPTION OF THE INVENTION

Figure 1:
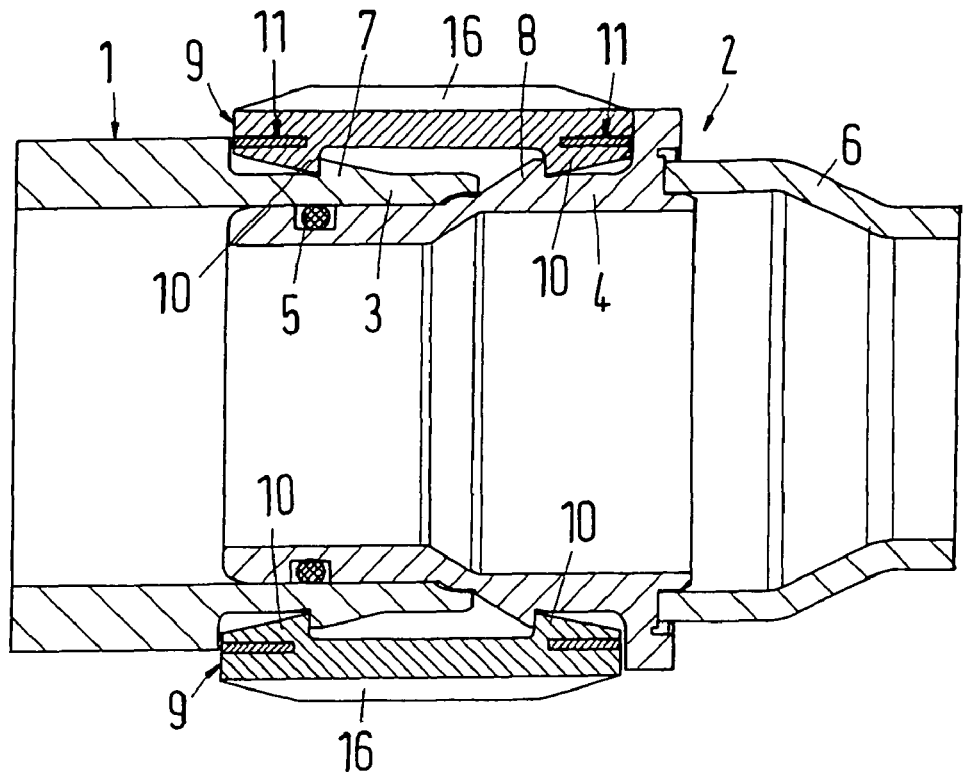
FIG. 1 shows an axial section through a connection of two pipes by means of a first embodiment of a coupling of the invention.

FIG. 1 and FIGS. 3 to 9 show a specific embodiment of the coupling of the invention and its individual parts. The coupling is used to join two pipes 1 and 2, which are made of a thermoplastic material or metal and are only partially shown in the drawings. Pipes 1 and 2 are shown in FIG. 2 without the coupling. The end sections 3 and 4 of the pipes 1 and 2 are inserted in the coupling and fitted together. The regions of the end sections 3 and 4 that are fitted together are sealed from each other by a gasket 5. The end section 4 is welded to the remaining part 6 of the pipe 2. Each end section 3 and 4 has a circumferential locking rib 7 and 8, respectively.

The coupling has radially inwardly projecting stop projections 10 at the ends of axial, flexurally stiff webs 9. The stop projections lock or snap in behind the locking ribs 7 and 8 when the end sections 7 and 8 are inserted in the coupling, and at the same time they fit together. For this purpose, the webs 9 are joined at their ends by elastic rings 11, and the locking ribs 7, 8 and the stop projections 10 are provided with inclined surfaces. Therefore, when the pipes 1, 2 are connected, the stop projections 10 slide over the locking ribs 7, 8, accompanied by elastic expansion of the rings 11, until the stop projections 10 snap in behind the locking ribs 7, 8.

To be able to release the connection of the pipes 1, 2, the rings 11 have a slightly oval or elliptical shape (see FIGS. 4 and 7), and the webs are joined with the rings 11 in the areas that lie between the areas with the smaller radius of curvature. Alternatively, the rings 11 can also be circular, with their diameter being greater than the inside diameter of the stop projections 10. Radial compression of the areas between the webs 9 causes the areas of the rings 11 that are connected with the webs 9 to be forced apart to such an extent that the inner edges of the stop projections 10 are forced radially outward beyond the circumference of the locking ribs 7, 8, after which the pipes 1, 2 can be separated. However, it is also possible to expand only one ring 11 in the areas connected with the webs 9 by radial compression of the ring areas between the webs 9 to separate the pipes 1, 2.

The webs 9 and rings 11 are separately produced and then connected with each other. Therefore, the rings can be individually produced in different shapes and from different materials.

In the specific embodiment shown in FIG. 1 and FIGS. 3 to 9, the rings 11 are produced from flat strips, whose ends are joined, e.g., by welding. To join the rings 11 with the webs 9, each end of the webs 9 is provided with a groove 12. The grooves 12 extend essentially transversely to the webs 9. The depth of the grooves 12 extends in the longitudinal direction of the webs 9, and the width of the grooves 12 corresponds to the thickness of the rings 11. The rings 11 are inserted with axially narrower regions 13 (see especially FIG. 9) in the grooves 12 and secured therein. The narrower regions 13 are somewhat bent, as are the grooves 12 that receive them (see FIGS. 4, 5, and 7). The bending as well as the steps 14 at the transitions from the narrower regions 13 to the broader regions of the rings 11 that lie between them prevent a relative rotation of the rings 11 and grooves 12 in the circumferential direction of the rings, to which prevention the steps 14 that rest against the side of the webs 9 next to the base of the groove also contribute. In addition, the narrower regions 13 are bounded by projecting rims 15, of which the rim 15 in section X is shown enlarged in FIG. 8. These rims 15 also assist in preventing the webs 9 and rings 11 from rotation relative to each other in the circumferential direction of the rings 11.

In addition, the webs 9 are provided with stiffening ribs 16, which extend parallel to one another on the outside of the webs 9 in the longitudinal direction of the webs 9. Seven stiffening ribs 16 are shown in the drawings. However, the number of stiffening ribs 16 depends on the width of the webs 9 and the width of the stiffening ribs 16 and on the required stiffness of the webs 9.

All parts of the coupling can be made of metal. The rings 11 preferably consist of spring steel but can also be made of elastically flexible plastic. Furthermore, it is possible for one of the rings 11 to be made of metal and the other of plastic. The webs 9 can also be made of plastic. The plastic of both the webs 9 and the rings 11 can be reinforced, for example, with glass fibers, carbon fibers, glass beads, or particles of minerals. However, the webs 9 can also have a metal core extrusion-coated with a plastic.

The rings 11 can be secured in the grooves 12 in a variety of ways. For example, it is possible to secure them in the grooves 12 by an interference fit or by material bonding, for example, by welding or adhesive bonding. It is also possible to secure them in the grooves 12 by positive locking. An example of a positive-locking connection is shown in FIG. 10, in which the grooves 12 are provided with elastically yielding stop projections 17 on the inside of one of their edges that extends transversely to the longitudinal direction of the web 9. When the rings 11 are inserted into the grooves 12, the stop projections 17 yield and lock into place behind the rings 11, which are inserted as far as the base of the groove. In this case, the webs 9 would consist of some elastic plastic or of a metal core extrusion-coated with some elastic plastic.

However, as shown in FIG. 11, it is also possible to form tapped holes 18 in the webs 9 transversely to the grooves 12. The tapped holes 18 extend at least as far as the grooves 12 or, as shown in FIG. 11, beyond the grooves 12. Screws can be screwed through these tapped holes 18 and through corresponding holes 19 (see FIGS. 12 and 13) in the rings 11. In addition, the stop projections 17 can also be provided here. This enables the coupling to withstand very high axial tensile forces exerted on the coupling by the pipes 1, 2.

The rings 11 can be designed as closed rings in the first place. However, they can also be designed as initially flat strips, which are then bent around more or less circularly and joined at their ends. For example, the ends can then be welded or joined by positive locking. Thus, as shown in FIG. 12, a positive-locking connection of the ends of the strips 11a can be produced by forming one end as a hook 20, preferably a right-angled hook, and by providing the other end with an undercut 21 that matches the shape of the hook 20. The hook 20 is then hooked into the undercut 21 after or during the bending of the strip 11a into a circular shape. During the assembly of the rings 11 and webs 9, the joint can then be laid in one of the grooves 12 according to FIG. 11 and additionally secured by two screws, each of which is screwed through one of two tapped holes 18, which pass through the corresponding grooves 12, and through one of the holes 19, which are placed near the ends of the strip 11a.

Alternatively, the strip 11a shown in FIG. 13 can be provided at one of its ends with a wedge-shaped tip 22 and at its other end with a wedge-shaped slot 23 that matches the shape of the tip 22. When the strip 11a is bent around, the tip 22 fits into the slot 23. The joint can then be inserted in a groove 12 of the web 9, as shown in FIG. 11, and secured by two screws that pass through the tapped holes 18 and holes 19.

FIG. 14 shows an embodiment of a coupling of the invention in an exploded view, in which two opposite webs 9 are joined on their radially inner side by a ring in the form of a spring band clip 24, which is made of spring steel. The spring band clip 24 is fitted onto the radially inner sides of the webs in grooves 25 that run transversely to the webs and is secured therein, for example, by adhesive and/or screws or by means of a snap fit. In the illustrated embodiment, the spring band clip 24 is secured in the grooves 25 by adhesive bonding.

The spring band clip 24 is a conventional hose band clip, which tightens by its own spring tension around a hose that is to be clamped on a pipe or pipe fitting and can be released again by expansion by means of suitable pliers applied at their radial spreading jaws 26 and 27. This causes the diameter of the spring band clip 24 to increase until a projection 28 of one spreading jaw 26 stops against the other spreading jaw 27.

In this design of the coupling, if the end sections 3 and 4 of the pipes 1 and 2 are inserted and fitted together in the coupling, the spring band clip 24 fastened to the webs 9 is expanded against its spring tension until the stop projections 10 lock in place behind the locking ribs 7, 8. To release the coupling and separate the pipes 1, 2, the spring band clip 24 is expanded manually or by means of pliers until the inside edges of the stop projections 10 lie on a larger circular arc than the outer edges of the locking ribs 7, 8.

Alternatively, the spring band clip 24 can be secured on the outer circumference of the webs 9; for example, it can likewise be fastened by adhesive in a transverse groove or secured by a snap fit or by means of screws.

In addition, instead of the illustrated spring band clip 24, a different clip can be used, for example, a tensible hose band clip, which expands when opened, e.g., a so-called worm drive hose clip.

In addition, with suitable design of the grooves 12, it is possible to fasten a spring band clip 24 in each groove 12.

The rings 11 can be connected by elongated narrow parts, which are fastened in longitudinal grooves of the webs 9 by a snap fit. In the case of still smaller diameters of the pipes, the rings 11 can then remain unchanged. Only the radii of curvature of the webs 9 and their stop projections 10 would have to be reduced accordingly.

If the webs 9 are made of thermoplastic plastic and each ring 11 is extrusion-coated with the material of the webs 9, a subsequent assembly of the webs and rings 11, 24 can be dispensed with. However, the webs 9 and rings 11, 24 can be made of different materials. If the rings 11, 24 are made of metal, the webs, if they surround the material of the rings 11, 24, simultaneously provide corrosion protection for the rings 11, 24.

In addition, in the case of two webs 9, the webs 9 can be joined by a joint (not shown), especially a film joint or hinge. The webs 9 then always remain joined, which simplifies especially their assembly, transport, or storage.

If the rings are designed as spring band clips 24 on or near the ends of the webs 9, the spreading jaws 26, 27 of one of the spring band clips 24 should be displaced by 1800 in the circumferential direction of the coupling relative to those of the other spring band clip 24. This makes it possible to move the webs uniformly over the entire circumference of the coupling in the radial direction towards the outside during the expansion of the spring band clips if the webs 9 are designed suitably long. Furthermore, the spreading jaws 26, 27 of one of the spring band clips 24 can be compressed with one hand, and the spreading jaws of the other spring band clip 24 can be compressed with the other hand, whether this is done by direct manual manipulation or by means of pliers, in order to spread or expand the spring band clips. This facilitates the operation of the spring band clips, especially if they have a large spring tension, in order to open the coupling.

Figure 15:
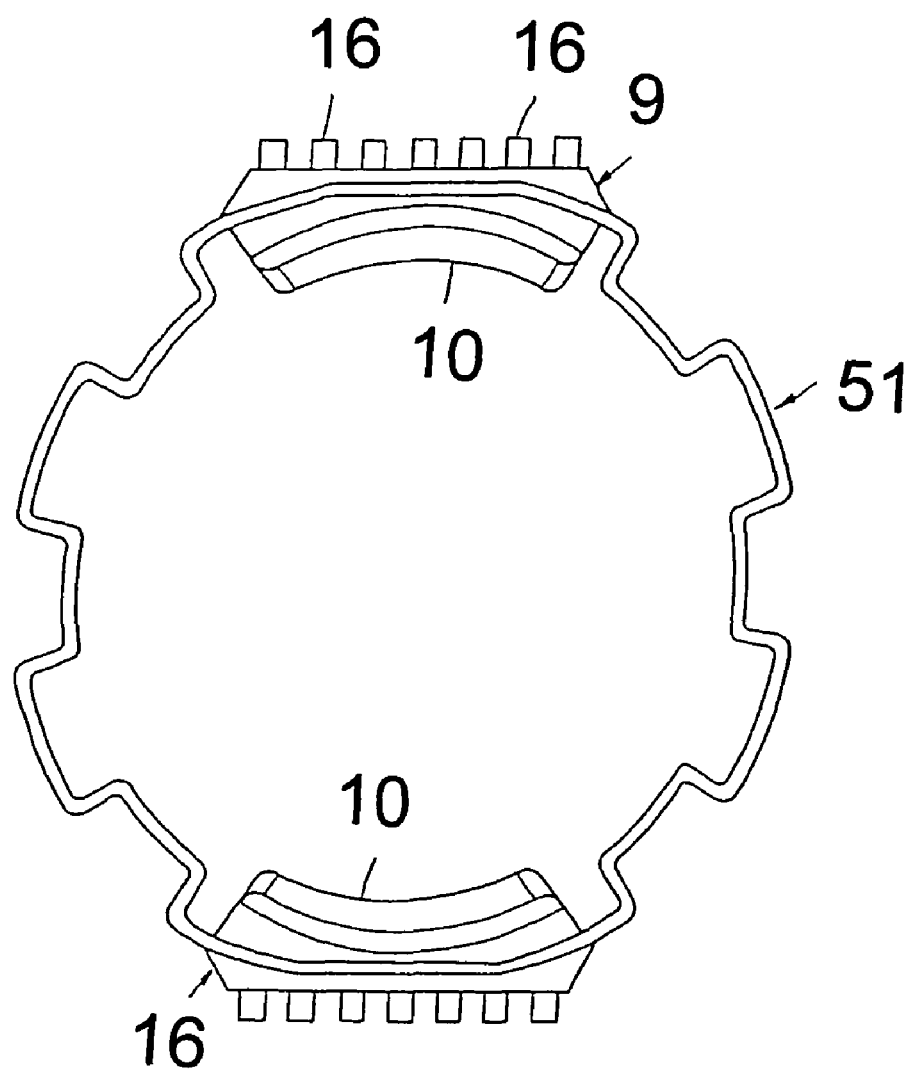
FIG. 15 is an axial view of a third embodiment of the invention, in which the shape of the ring is modified relative to the embodiment of FIG. 1.

FIG. 15 shows an axial view of an embodiment of the coupling of the invention, in which the rings 51 are likewise made of a spring band, which, however, is corrugated. The corrugated form can be more or less rectangular, as shown in the drawing. Alternatively, the corrugated form can have modified half-waves, for example, semicircular half-waves. Furthermore, the corrugated form does not have to be periodic. Depending on the circumference of the rings 51, the width of the webs 9, and the width of the half-waves, three or more webs 9 can be provided instead of only two webs 9 in each case. In this regard, the webs 9 can be arranged with a uniform distribution over the circumference of the rings 51, which also applies to the uncorrugated rings 51 or clips. At the same time, the corrugations can help prevent a displacement of the webs 9 in the circumferential direction of the rings 51.

Instead of the spring band clip 24 made of a flat band or strip, as shown in FIG. 14, a spring band clip with a corrugated band or strip can also be used.

In addition, the webs in a form similar to that of the webs 9 can be produced from a sheet-metal part by punching and bending.

Figure 16:
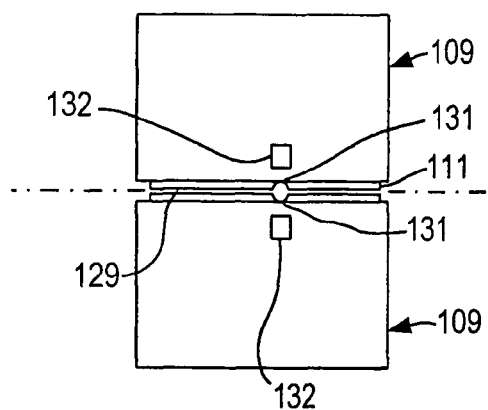
FIG. 16 is a side view of a fourth embodiment of the invention.
Figure 17:
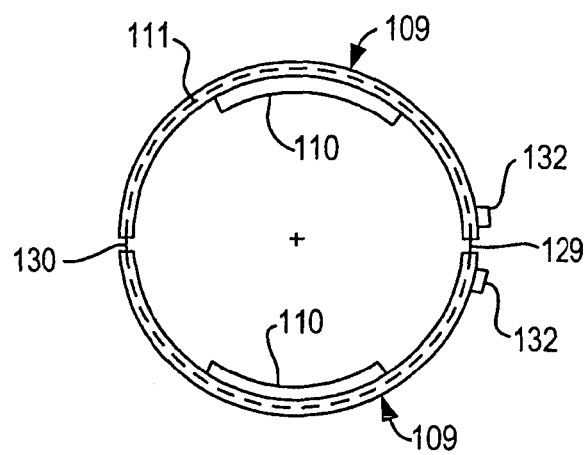
FIG. 17 is an axial view of the embodiment of FIG. 16.

In the embodiment of the coupling of the invention according to FIGS. 16 and 17, the coupling comprises a ring 111 and two webs 109. In this embodiment, the width of the ring 111 is almost the same as the axial length of the webs 109. The ring 111 is likewise produced from a spring steel band. However, it has a narrow break (interruption) 129, i.e., a slit or gap that runs all the way through axially. However, the break 129 could also be wider. The ring 111 would then be shaped somewhat like a C. Basically, it would only be necessary that it extend more than 180° in the circumferential direction.

The webs 109 again consist of plastic, with which half of each ring 111 is extrusion-coated. The ring 111 is secured in the webs 109 in this way. The extrusion coating of the ring saves separate assembly of the parts of the coupling. At the same time, the plastic provides the ring with corrosion protection.

The webs 109 extend on one side close to the break 129 in the ring 111 and on the other side close to a joint 130, which is formed as a single piece with the ring 111 on the diametrically opposite side from the break 129 and results from the flexural elasticity of the spring steel band that forms the ring 111 between the webs 109. Since, the webs 109 extend almost 180° along the circumference of the coupling or the ring 111 and, in addition, are reinforced by the broad ring 111, they are very flexurally stiff transversely to their axial longitudinal direction, especially about a transverse axis that runs through the break 129 and the joint 130. Therefore, the stiffening ribs 116 of the previously described embodiments can be eliminated. However, the webs 109 are provided with stop projections 110 as in the preceding embodiments.

Figure 2:
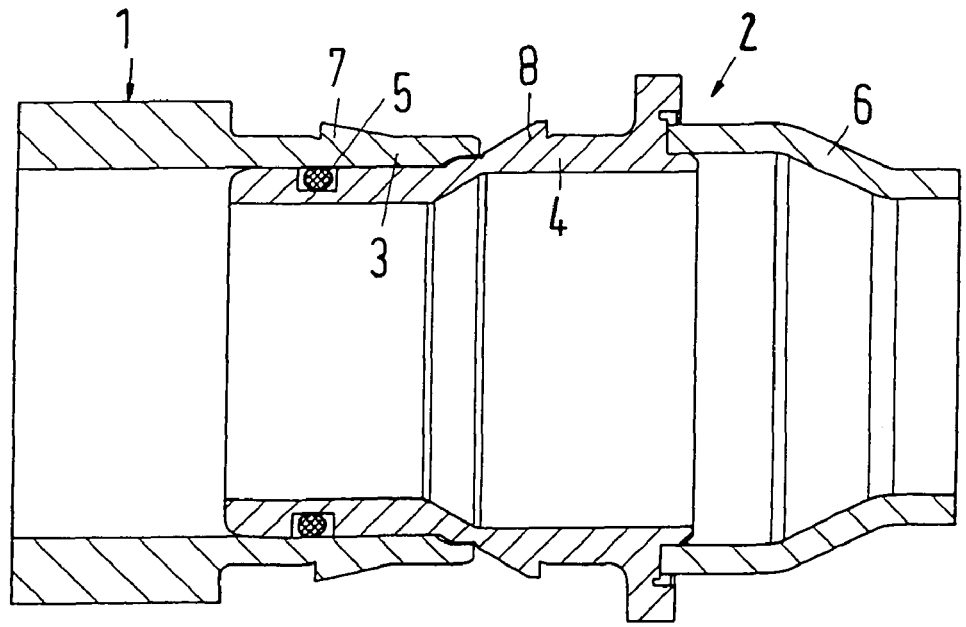
FIG. 2 is the same axial section through the pipes to be connected as in FIG. 1 but without the coupling.
Figure 3:
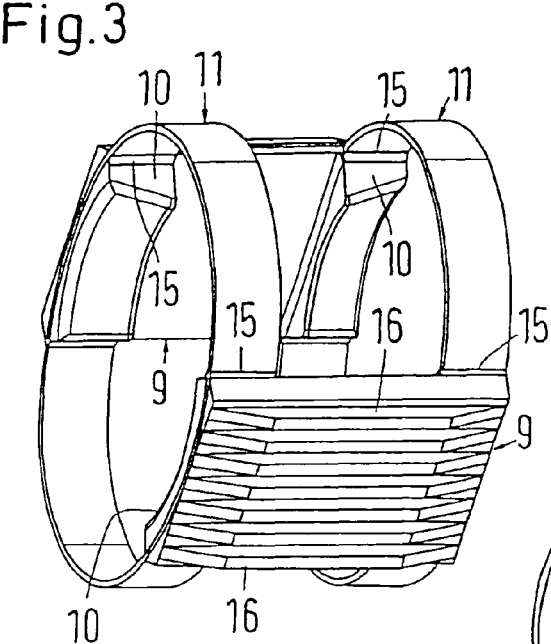
FIG. 3 is a perspective view of the coupling of FIG. 1.
Figure 4:
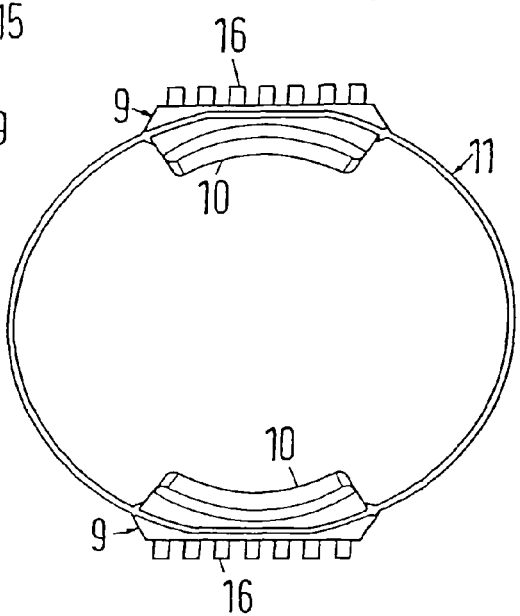
FIG. 4 is an axial view of the coupling of FIG. 1.
Figure 5:
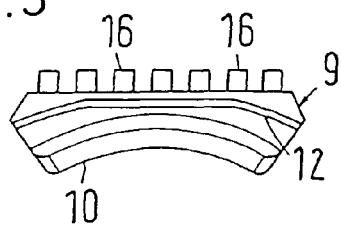
FIG. 5 is a front elevation of a web of the coupling of FIG. 1.
Figure 6:
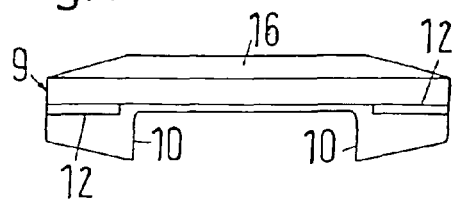
FIG. 6 is a side view of the web of FIG. 5.
Figure 8:
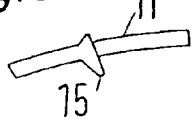
FIG. 8 is an enlarged view of the section X of the view of the ring of FIG. 7.
Figure 7:
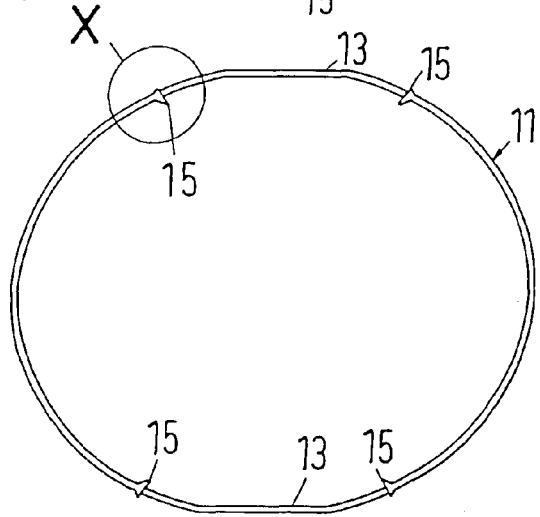
FIG. 7 is an axial view of a ring of the coupling of FIG. 1.
Figure 9:
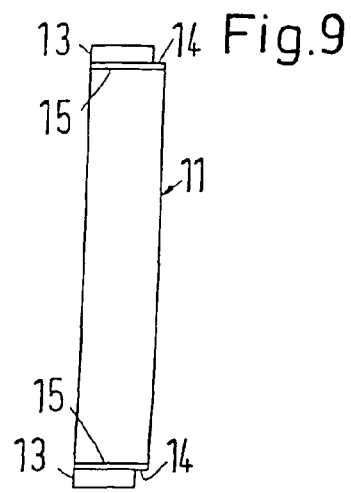
FIG. 9 shows a side view of the ring of FIG. 7.

To remove at least one of the pipes 1, 2 (FIGS. 1 and 2) from the coupling to the right or left, as shown in FIG. 116, for the purpose of breaking the connection of the pipes, it is only necessary to insert a spreading tool, e.g., simple spreading pliers, into the break 129 and then to operate it, so that the ring 111 is turned about the joint 130, and thus the webs 109 and their stop projections 110 are also moved radially apart until the stop projections 110 no longer engage the locking ribs 7, 8 (FIGS. 1 and 2).

To design the break 129 as narrow as possible, recesses 131, into which the spreading arms of spreading pliers fit, can be formed in the ends of the ring 11. Alternatively or additionally, radially outwardly projecting knobs 132 can be formed on the webs 109 in the vicinity of the break 129, and the spreading pliers or other spreading tool can be applied on these knobs 132.

Figure 18:
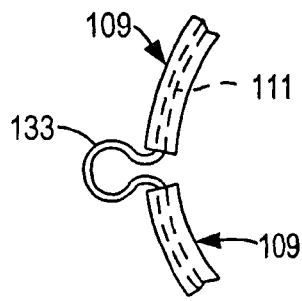
FIG. 18 shows an enlarged section of the coupling of FIGS. 16 and 17 with a modified embodiment of a joint of the coupling of FIGS. 16 and 17.

In the modification of the embodiment of FIGS. 16 and 17 that is illustrated as an enlarged section in FIG. 18, the joint 133 of the ring 111 is a bulge that projects outwardly from the ring 111 between the webs 109 opposite the break 129. It is shown here as a more or less omega-shaped bulge, but it could also be C-shaped. Due to this shape of the joint 133, when the coupling is opened, the webs 109 and thus their stop projections 110 are moved more or less the same distance in the radial direction of the pipes and disengage from the locking ribs 7, 8 of the pipes 1, 2 without a large spreading movement of the ring 111. This is advantageous especially in the case of very small pipe diameters and correspondingly small ring diameters.

Figure 19:
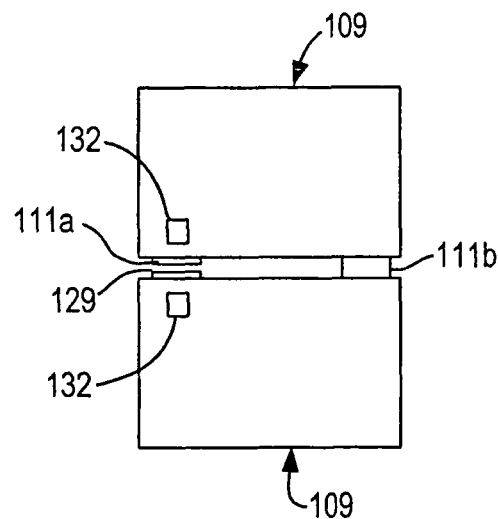
FIG. 19 shows an embodiment that is modified in such a way relative to the fourth embodiment that two narrower rings are provided instead of one broad ring made of spring steel.
Figure 19A:
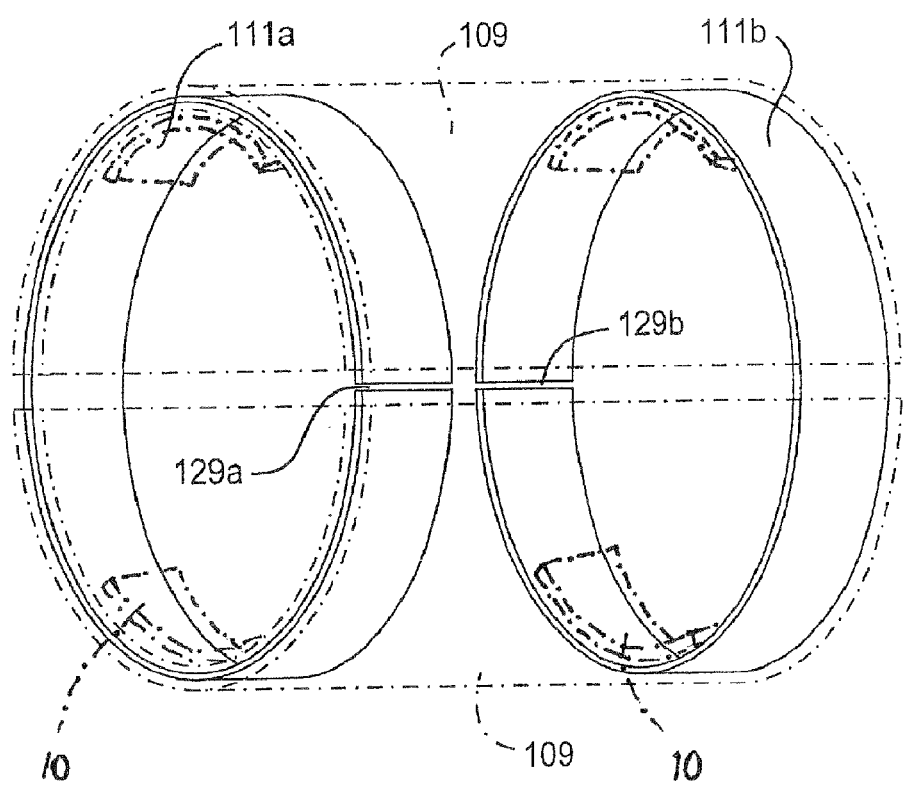
FIG. 19a is a perspective view showing the two rings.

In the embodiment shown in FIG. 19, instead of the one broad ring 111 shown in FIGS. 16 and 17, two narrower rings 111a and 111b, shown in FIG. 19a, are provided. They are embedded in or extrusion-coated by the plastic of the webs 109 close to or at each axial end of the webs. In order to make the rings visible in FIG. 19a, they are shown in dash-dot lines. In this regard, the break 129 in one of the rings 111a or 111b is displaced 180° relative to the break in the other ring in the circumferential direction of the ring 111. This arrangement of the breaks 129 in the rings 111a or 111b also assists in allowing the webs 109 to be uniformly lifted from the pipes 1, 2 in the radial direction over their circumference until their stop projections 110 no longer engage the locking ribs 7, 8 of the pipes 1, 2, so that the pipes 1, 2 can be separated. In this regard, it is also possible to spread only one of the rings 111a or 111b to disengage only one of the pipes 1, 2.

In the embodiment according to FIGS. 16 to 19, each of the webs 109 can be provided in its axial center with a radially inwardly projecting stop rib to limit the distance the pipe ends can be pushed into the coupling and to ensure axial centering of the pipe ends in the coupling.

In addition, the webs can be held together by a connecting device (not shown), which releasably bridges the ring break or each ring break. The connecting device can have a ring, preferably an oval or elongated ring, which can lock into place in undercuts of projections, for example, the knobs, on the webs on both sides of the break(s), or it can have projections of this type on the webs, which bridge the break(s) with axial hooks and are formed on or fastened to at least one of the projections formed on one side of the break and can be hooked onto or locked in place behind a projection that is formed on the other side of the break. Instead of the hooks, it is also possible for only axial extensions on at least one of the projections, which is provided on a web or on the web on one side of the break(s), to extend as far as an opposing projection, which is provided on the other side of the break(s), and to be releasably fastened to this opposing projection by a bolt, which passes through holes in the extensions and in the opposing projection.

This connecting device offers additional protection against spreading of the rings under high bending forces exerted on the coupling, for example, in a traffic accident of a motor vehicle in which pipes are joined by the coupling. If, on the other hand, the coupling is to be opened to separate the pipes, the connection of the webs produced by the connecting device can be released in advance. At the same time, the connecting device serves as an assembly indicator, for if the webs have been connected by the connecting device, this indicates that the connection of the pipes has been carried out correctly, since the connection of the webs by the connecting device is possible only if the pipes have first been correctly joined by the coupling.

Figure 20:
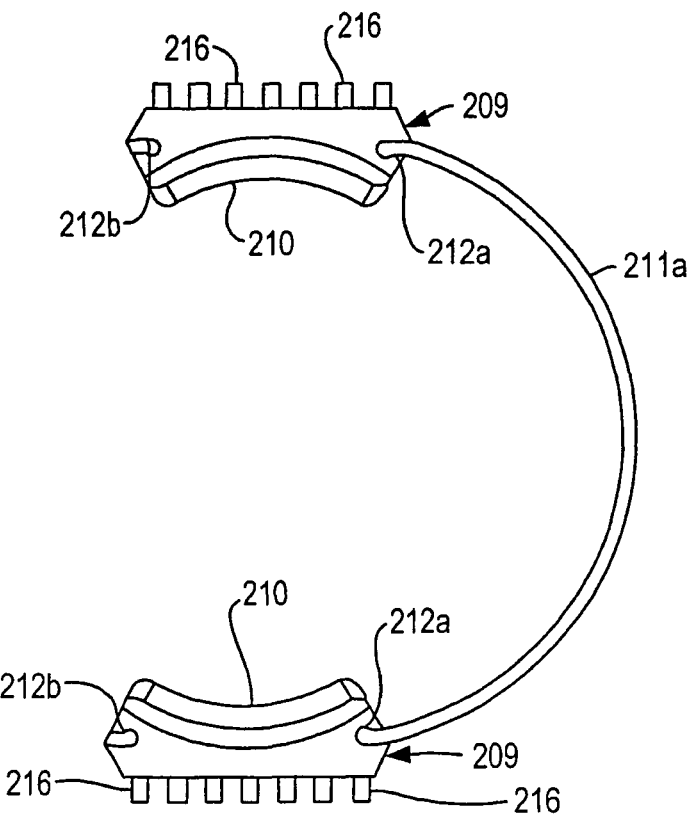
FIG. 20 shows an axial view of a part of a fifth embodiment of a coupling of the invention.

The embodiment of the coupling of the invention that is shown in FIG. 20 differs from the embodiment shown in FIG. 1 first by virtue of the fact that the webs 209 are not provided with grooves 212 that pass all the way through in the circumferential direction of the coupling but rather with undercut grooves 212a, 212b that extend only partially into the webs 209 in the circumferential direction of the coupling at each axial end of the webs 209. Second, the embodiment of FIG. 20 differs from that of FIG. 1 by virtue of the fact that the webs 209 are not connected by one-part rings, such as the rings 211, but rather are connected at each of their axial ends by ring segments 211a, Le., a total of four elastically flexible segments made of plastic or spring steel, of which only one is shown in FIG. 20. The ring segments 211a are strip-shaped, and their ends are formed to conform to the grooves 212a, 212b, so that the ends of the ring segments lla can fit into the respective grooves 212a, 212b, in which they are held by frictional engagement in the axial direction and by positive locking in the circumferential direction. The application of radial pressure on the ring segments 211afrom the outside lifts the webs 9 radially from the pipes 1, 2 to disengage their stop projections from the locking ribs 7, 8 of the pipes 1, 2, and thus to separate the pipes.

Alternatively, instead of the grooves 212a, 212b that are axially closed at one end, it is possible to form axially continuous grooves with the same cross sectional shape as that of the grooves 212a, 212bin the sides of the webs 209 and to design the ring segments 211a sufficiently wide that they, like the ring 211 in FIG. 216, extend at least over almost the entire length of the webs 209. In this case, only two ring segments all together would be necessary.

Another alternative consists in providing several webs 209 that are narrower in the circumferential direction of the coupling and are uniformly distributed over the circumference of the coupling. These webs 209 are each connected by ring segments that are narrower in the circumferential direction of the coupling but otherwise have the same form and are made of the same material as the ring segments 211a. Therefore, depending on the size of the diameter of the pipes 1, 2, the diameter of the coupling can be adapted to the diameter of the pipe by using a suitable number of webs and ring segments.

While specific embodiments of the invention have been shown and described in detail to illustrate the inventive principles, it will be understood that the invention may be embodied otherwise without departing from such principles.

What is claimed is:

1. A coupling for joining two pipes having end sections, each of which is provided with a circumferential locking rib and can be inserted into the coupling, wherein the coupling has:
   at least one single unitary piece elastic ring that joins at least two elongated webs, and
   wherein each single unitary piece elastic ring has a single break, and
   wherein the webs have radially inward projecting stop projections located at respective longitudinal ends of the webs, and
   wherein the stop projections lock into place behind the locking ribs of the pipe end sections when the end sections are inserted into the coupling to lock the two pipes together in joined connection, and
   wherein the coupling can be unlocked to release the connection of the pipes by expanding the at least one single unitary piece elastic ring, and
   wherein each single unitary piece elastic ring is made of spring steel, and
   wherein the webs are made of plastic, and
   wherein the at least one ring is extrusion-coated by the material of the webs thereby holding and embedding each single unitary piece elastic ring in the plastic of the webs except for the break of each single unitary piece elastic ring and an uncoated joint portion of each single unitary piece elastic ring.

2. The coupling in accordance with claim 1, wherein the joint of each single unitary piece elastic ring is an elastically flexible part of the at least one single unitary piece elastic ring.

3. The coupling in accordance with claim 1, wherein the webs have radially outwardly projecting knobs on both sides of the break in the at least one single unitary piece elastic ring.

4. The coupling in accordance with claim 3, wherein the at least one single unitary piece elastic ring consists of first and second rings that are provided close to or at each end of the webs, and the break in the first ring is arranged with a displacement of 180° relative to the break in the second ring in the circumferential direction of the two rings.

* * * * *